US009073540B2

(12) United States Patent
Cauthen

(10) Patent No.: US 9,073,540 B2
(45) Date of Patent: Jul. 7, 2015

(54) DECELERATION CONTROL SYSTEM FOR A VEHICLE

(71) Applicant: Toyota Motor Engineering & Manufacturing North America, Inc., Erlanger, KY (US)

(72) Inventor: Craig A. Cauthen, Orange, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 76 days.

(21) Appl. No.: 13/955,453

(22) Filed: Jul. 31, 2013

(65) Prior Publication Data

US 2015/0039191 A1 Feb. 5, 2015

(51) Int. Cl.
*G06F 7/00* (2006.01)
*B60W 10/196* (2012.01)
*B60W 10/04* (2006.01)
*B60W 10/06* (2006.01)
*B60W 10/08* (2006.01)
*B60W 10/101* (2012.01)
*B60W 30/18* (2012.01)
*B60W 40/076* (2012.01)

(52) U.S. Cl.
CPC ............ *B60W 10/196* (2013.01); *B60W 10/04* (2013.01); *B60W 2510/18* (2013.01); *B60W 10/06* (2013.01); *B60W 10/08* (2013.01); *B60W 10/101* (2013.01); *B60W 30/18072* (2013.01); *B60W 40/076* (2013.01); *B60W 2510/0647* (2013.01); *B60W 2550/142* (2013.01); *Y10T 477/675* (2015.01); *Y10T 477/679* (2015.01); *Y10T 477/69* (2015.01)

(58) Field of Classification Search
CPC ... B60W 10/06; B60W 10/08; B60W 10/105; B60W 10/107; B60W 30/18072; B60W 40/076; B60W 2510/0647; B60W 2550/142; B60W 10/196; B60W 10/04; B60W 2510/18; Y10T 477/675; Y10T 477/679; Y10T 477/69
See application file for complete search history.

(56) References Cited

U.S. PATENT DOCUMENTS

| | | | |
|---|---|---|---|
| 5,514,050 A | 5/1996 | Bauerle et al. | |
| 6,066,069 A | 5/2000 | Yorndran | |
| 6,231,480 B1 | 5/2001 | Sasaki | |
| RE37,598 E * | 3/2002 | Toukura et al. | 477/40 |
| 6,368,247 B1 | 4/2002 | Kondo | |
| 6,519,937 B2 | 2/2003 | Nanri et al. | |
| RE38,241 E * | 8/2003 | Toukura | 477/46 |
| 6,679,807 B2 | 1/2004 | Kato et al. | |
| 7,490,588 B2 * | 2/2009 | Kimura et al. | 123/325 |

(Continued)

FOREIGN PATENT DOCUMENTS

| | | |
|---|---|---|
| EP | 1809506 | 9/2010 |
| JP | 03-103655 | 4/1991 |

(Continued)

*Primary Examiner* — David D Le
(74) *Attorney, Agent, or Firm* — Snell & Wilmer LLP

(57) ABSTRACT

A system for decelerating a hybrid vehicle, the system includes a continuously variable transmission (CVT), a brake pedal, an accelerator pedal, a sensor for detecting a vehicle deceleration, a memory for storing a target deceleration corresponding to a coasting deceleration of the vehicle, and a processor. When the brake pedal and the accelerator pedal are released, the vehicle coasts. If the vehicle deceleration does not match the target deceleration, the processor adjusts the torque output by the CVT so that the vehicle deceleration substantially matches the target deceleration.

25 Claims, 4 Drawing Sheets

(56) References Cited

U.S. PATENT DOCUMENTS

| | | |
|---|---|---|
| 7,747,373 B2 | 6/2010 | Ogawa |
| 7,908,067 B2 | 3/2011 | Soliman et al. |
| 8,251,042 B2 | 8/2012 | Ito |
| 8,255,139 B2 | 8/2012 | Whitney et al. |
| 8,328,690 B2 | 12/2012 | Ohtsu |
| 2003/0098185 A1* | 5/2003 | Komeda et al. .............. 180/65.2 |
| 2005/0234626 A1* | 10/2005 | Shiiba et al. .................... 701/70 |
| 2006/0064225 A1* | 3/2006 | Tabata et al. .................... 701/96 |
| 2006/0287798 A1* | 12/2006 | Inoue et al. ..................... 701/70 |
| 2008/0254937 A1* | 10/2008 | Makiyama ...................... 477/47 |
| 2011/0251017 A1 | 10/2011 | Miyazaki |
| 2012/0072085 A1 | 3/2012 | Wurthner et al. |

FOREIGN PATENT DOCUMENTS

| | | |
|---|---|---|
| JP | 10095252 | 4/1998 |
| JP | 2008-239130 | 10/2008 |

* cited by examiner

DECELERATION CONTROL SYSTEM FOR A VEHICLE

BACKGROUND

1. Field

The present application relates to systems and methods for controlling deceleration of continuously variable transmission (CVT) vehicles.

2. Description of the Related Art

CVT vehicles do not have set gear ratios as in conventional transmissions. When a CVT vehicle coasts or travels with the accelerator and brake pedals released, the CVT vehicle does not decelerate like a conventional or step transmission vehicle. Rather, CVT vehicles often have logic which aids a driver decelerate the vehicle. For example, a hybrid vehicle may have a sequential mode that creates virtual torque steps. The hybrid vehicle may activate the virtual torque steps when going downhill while the brake pedal is depressed. However, it may be difficult for a driver to smoothly decelerate while moving downhill. The driver may also prefer to coast downhill rather than manage the braking and drive mode of the vehicle.

Thus, there is a need for CVT control logic which enhances driver experience by smoothly decelerating the vehicle.

SUMMARY

The present application relates to CVT vehicles which uses feedback to control the vehicle's deceleration regardless of a road grade. In one implementation, a system for controlling deceleration of a vehicle comprises a continuously variable transmission (CVT), a brake pedal, an accelerator pedal, a sensor for detecting a vehicle deceleration, a memory for storing a target deceleration corresponding to a coasting deceleration of the vehicle, and a processor configured to adjust a torque output by the CVT so that the vehicle deceleration substantially matches the target deceleration when the brake pedal and the accelerator pedal are released. The brake pedal and the accelerator pedal may each have an applied or depressed position or state and a released or unapplied position or state.

In another implementation, a system for controlling deceleration of a vehicle comprises a continuously variable transmission (CVT), a brake pedal, an accelerator pedal, an accelerometer for detecting a vehicle deceleration, a speed sensor for detecting a vehicle speed, a memory for storing a target deceleration corresponding to a coasting deceleration of the vehicle, and a processor configured to adjust a torque output by the CVT so that the vehicle deceleration substantially matches the target deceleration when the brake pedal and the accelerator pedal are released and the vehicle speed is within a predetermined range.

In yet another implementation, the present application provides a method for controlling deceleration of a vehicle comprising detecting a vehicle deceleration, determining a target deceleration corresponding to a coasting deceleration of the vehicle, comparing the vehicle deceleration with the target deceleration, determining a target torque to substantially match the vehicle deceleration with the target deceleration, and applying the target torque.

BRIEF DESCRIPTION OF THE DRAWINGS

The features, obstacles, and advantages of the present application will become more apparent from the detailed description set forth below when taken in conjunction with the drawings, wherein.

DETAILED DESCRIPTION

Apparatus, systems and methods that implement the implementations of the various features of the present application will now be described with reference to the drawings. The drawings and the associated descriptions are provided to illustrate some implementations of the present application and not to limit the scope of the present application. Throughout the drawings, reference numbers are re-used to indicate correspondence between referenced elements.

Figure 1:
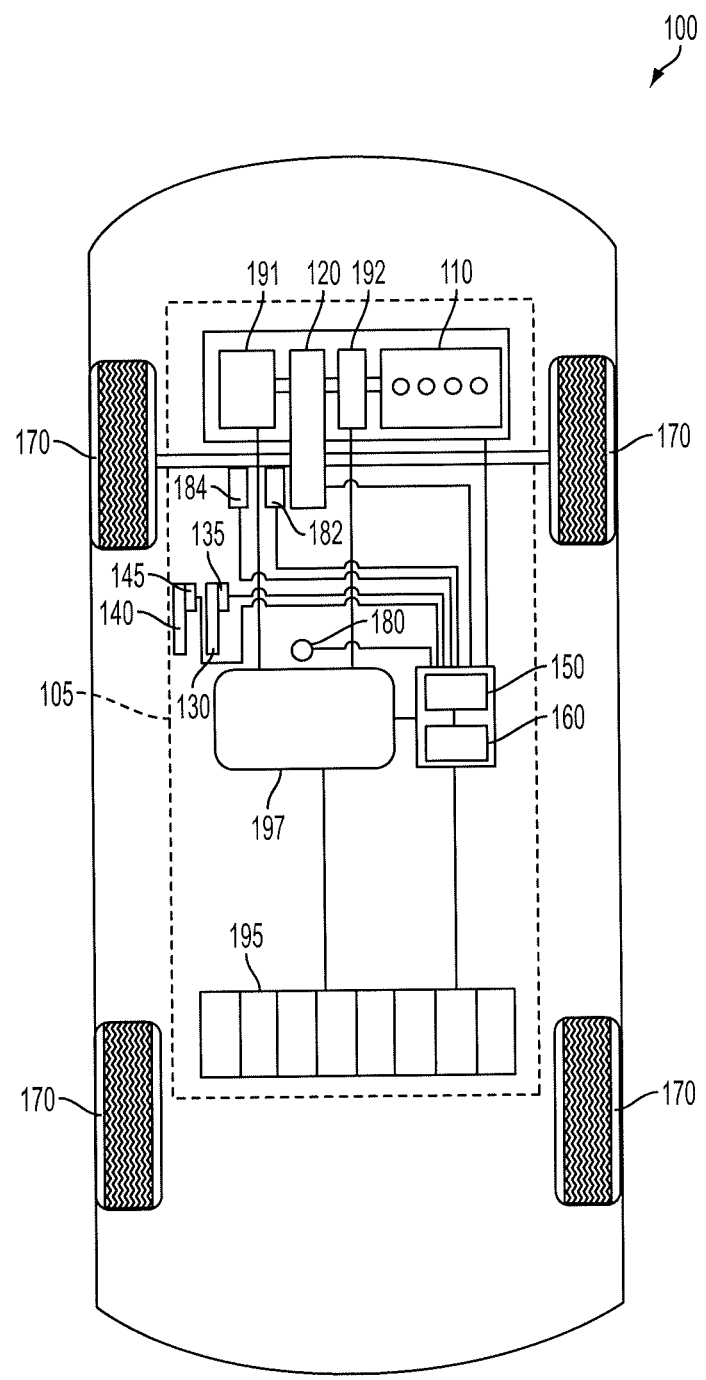
FIG. 1 is a diagram of a hybrid vehicle including an engine and a transmission according to an implementation of the present application.

In one implementation, the present application includes a hybrid vehicle 100 as shown in FIG. 1. The hybrid vehicle 100 can include a drive force unit 105 and wheels 170. The drive force unit 105 further includes an engine 110, a first electric motor-generator 191, a second electric motor-generator 192, a battery unit 195, an inverter box 197, a brake pedal 140, a brake pedal sensor 145, an accelerator pedal 130, an accelerator pedal sensor 135, a transmission 120, a processor 150, a memory 160, a button 180, a speed sensor 182, and an accelerometer 184. In one implementation, the brake pedal 140 has an applied or depressed position or state and a released or unapplied position or state as determined by the brake pedal sensor 145. In one implementation, the accelerator pedal 130 has an applied or depressed position or state and a released or unapplied position or state as determined by the accelerator pedal sensor 135.

The engine 110 primarily drives the wheels 170. The engine 110 can be an internal combustion engine. The internal combustion engine can combust fuel, such as gasoline, ethanol, diesel, biofuel, or other types of fuels which are suitable for combustion. The accelerator pedal sensor 135 can detect a pressure applied to the accelerator pedal 130 or a position of the accelerator pedal 130, which can adjust the power and torque provided by the engine 110 and/or the first and second motor-generators 191 and 192. The torque output by the engine 110 is received by the transmission 120. The first and second motor-generators 191 and 192 can also output torque to the transmission 120. The engine 110 and the first and second motor-generators 191 and 192 may be coupled through a planetary gear (not shown in FIG. 1). The transmission 120 delivers an applied torque to the wheels 170. The torque output by the engine 110 does not directly translate into the applied torque to the wheels 170.

The first and second motor-generators 191 and 192 can serve as motors which output torque in a drive mode, and can serve as generators to recharge the battery unit 195 in a regeneration mode. The electric power delivered from or to the first and second motor-generators 191 and 192 passes through inverter box 197 to the battery unit 195. The brake pedal sensor 145 can detect pressure applied to the brake pedal 140 or a position of the brake pedal 140, which may further affect the applied torque to the wheels 170. The speed sensor 182 is connected to an output shaft of the transmission 120 to detect a speed input which is converted into a vehicle speed by the processor 150. The accelerometer 184 is connected to the body or engine of the hybrid vehicle 100 to detect the actual acceleration or deceleration of the hybrid vehicle 100.

The button 180 may be a button on an instrument panel (not shown in FIG. 1) of the hybrid vehicle 100, or may be located elsewhere within the driver's reach, such as on or near a steering wheel, or on the dash. The button 180 may be a switch or other similar device having an on state and an off state, and capable of sending a signal indicating the on state or the off state. Alternatively, the button 180 may be a touch-sensitive area capable of sending signals which may be interpreted as on or off, or may be part of a touch-screen interface capable of sending on and off signals. The processor 150 may detect a signal from the button 180 to activate or deactivate the deceleration control logic. In other implementations, the deceleration control logic may activated and deactivated automatically and thus may not need to be activated by the driver, obviating the need for the button 180.

The transmission 120 is a transmission suitable for a hybrid vehicle. The transmission 120 can be an ECVT, which is coupled to the engine 110 as well as the first and second motor-generators 191 and 192. The transmission 120 can deliver torque output from a combination of the engine 110 and the first and second motor-generators 191 and 192. The processor 150 controls the transmission 120, utilizing data stored in the memory 160 to determine the applied torque delivered to the wheels 170. For example, the processor 150 may determine that at a certain vehicle speed, the engine 110 should provide a fraction of the applied torque to the wheels 170 while the first motor-generator 191 and/or the second motor-generator 192 provides most of the applied torque. The processor 150 and the transmission 120 can control an engine speed of the engine 110 independently from the vehicle speed.

Figure 2:
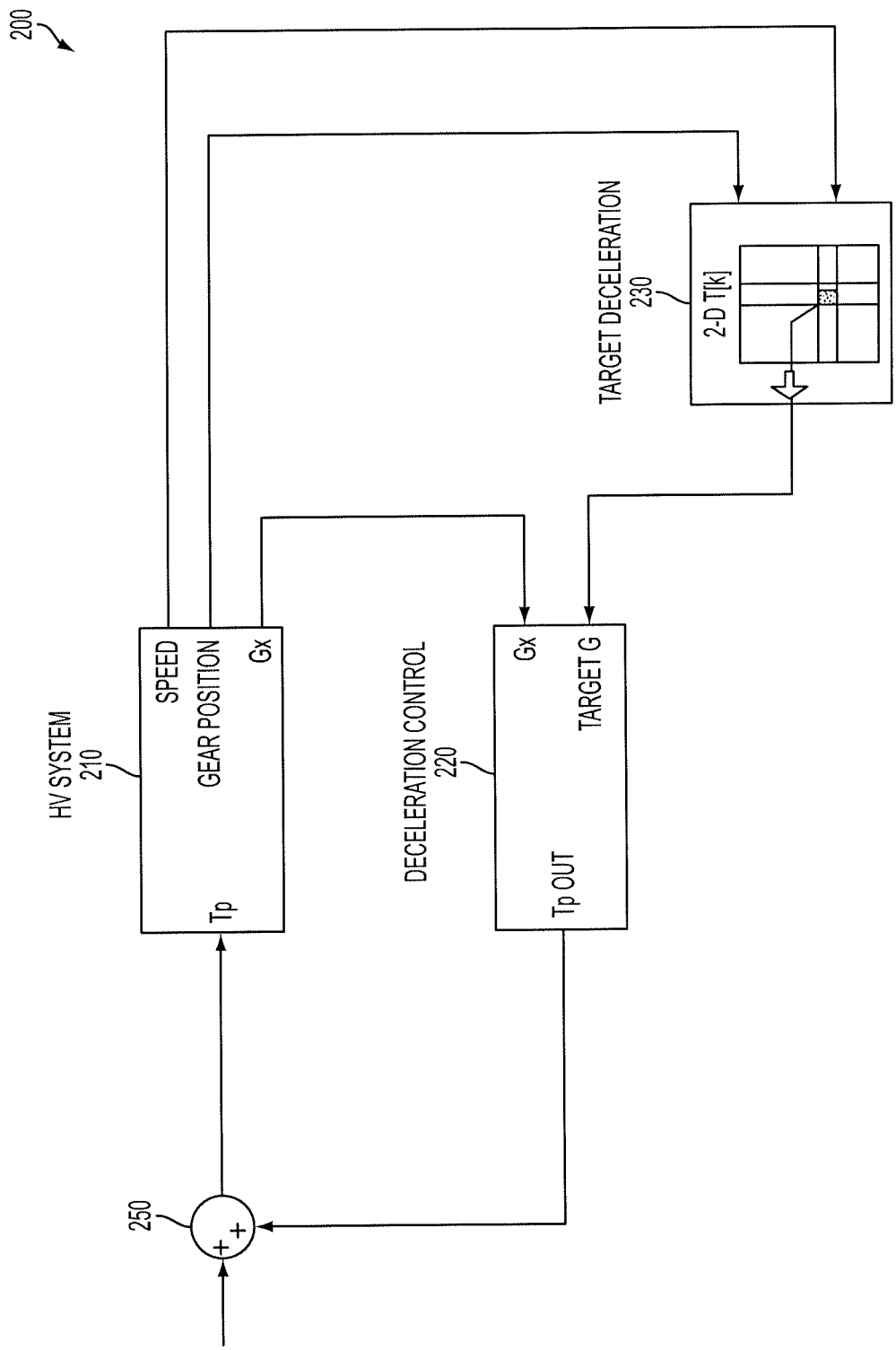
FIG. 2 is a conceptual block diagram of a deceleration control system according to an implementation of the present application.

FIG. 2 presents a block diagram of a deceleration control system 200 according to one implementation of the present application. The deceleration control system 200 is a feedback system adjusting torque for deceleration. A hybrid vehicle (HV) system 210 provides a current vehicle speed, current gear position, and current vehicle acceleration (Gx), which is a longitudinal acceleration. The speed of the vehicle may be determined from the speed sensor 182. The acceleration of the vehicle may be determined from the accelerometer 184. The gear position may be available from the transmission 120 or other related component, such as the processor 150. The HV system 210 controls a propeller shaft torque Tp.

A target deceleration logic 230 uses the speed and the gear position to determine a target deceleration (target G). The target deceleration corresponds to a coasting deceleration of the vehicle. The coasting deceleration may correspond to the deceleration of the vehicle with the accelerator pedal and brake pedal released under normal driving circumstances, such as on a level road at or near sea level.

A deceleration control 220 receives the current vehicle acceleration Gx and the target deceleration (target G) to determine what propeller shaft torque (Tp OUT) must be added or subtracted to achieve the target deceleration. The torque Tp OUT is applied until Gx matches or substantially matches target G. The torque may be varied by changing the speeds of the engine and/or the motors-generators. The additional torque may be added to or subtracted from the current propeller shaft torque Tp.

When Gx matches or substantially matches target G, the vehicle decelerates as if it was coasting. For example, the vehicle 100 may be travelling downhill on a long, shallow downgrade. The driver may not wish to actively manage deceleration and may choose to release the accelerator pedal 130 and the brake pedal 140 to coast. However, the vehicle 100 decelerates slower when travelling down a long, shallow downgrade than on a flat, level road. Applying Tp OUT changes the deceleration of the vehicle 100 to more closely match the coasting deceleration on a level road.

At a feedback loop 250, the torque Tp OUT is added to the current torque Tp, which is then detected by the HV system 210 to continue this feedback loop. For example, the Tp may have incrementally adjusted the current vehicle acceleration closer to the target deceleration. Based on the new current vehicle acceleration, the target deceleration logic 230 may calculate a new target deceleration and the deceleration control logic 220 may then calculate a new Tp OUT.

Figure 3:
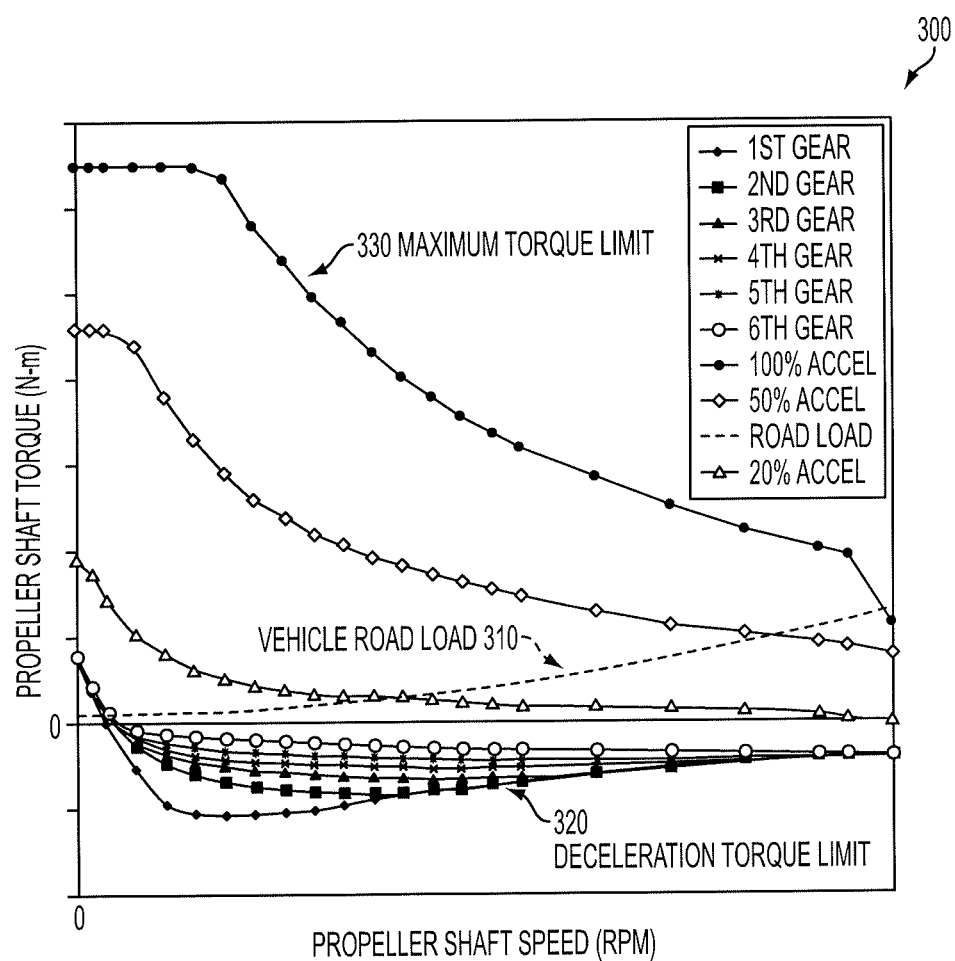
FIG. 3 is a map illustrating torque limits according to an implementation of the present application.

FIG. 3 illustrates a map 300 of torque limits based on engine speed and torque. A vehicle road load curve 310 corresponds to a road load, which is a load put on by a vehicle due to its weight, bearings, gears, aerodynamic drag, etc. The road load may be measured by the torque produced when the vehicle is driving in neutral. The road load curve 310 corresponds to the expected road load when the vehicle is driving in normal conditions, such as on a level road.

The map 300 further shows torque limits at various accelerator pedal applications. The maximum torque limit curve 330 corresponds to 100% accelerator pedal application. The map 300 shows curves corresponding to 100%, 50%, and 20%, but in other implementations other applications may be used, such as every 10%. For a given pedal application, such as 100%, the corresponding curve, such as the maximum torque limit curve 330, may be used. For pedal applications without a corresponding curve, a curve is interpolated between the two nearest curves. For example, a 95% pedal application is interpolated from the 90% and 100% curves.

At 0% pedal application, the torque limits may vary by gear. A deceleration torque limit curve 320 may correspond to the first gear. The map 300 corresponds to a normal or default map. When the vehicle is, for example, travelling down a long, shallow downgrade, the actual torque produced varies from the map 300.

The deceleration control logic attempts to restore the vehicle's movement to follow the torque limits of the map 300. For example, the target deceleration and target torque may be determined as the torque needed to return to a given torque curve. In other words, the deceleration control logic changes the 0% application curve. Because the vehicle interpolates pedal application between two curves, changing the 0% curve requires additional considerations when reverting to a normal logic. For example, the deceleration control logic may store a previously used 0% curve or target deceleration for use as the 0% curve when the deceleration control logic is canceled.

Alternatively, the target deceleration may be determined by calculating a gap between the road load and the torque curve. As the engine RPM increases, the vehicle road load curve 310 increases, for instance due to additional aerodynamic drag and other forces. The gap between the vehicle road load curve 310 and a torque curve increases, signifying more deceleration when coasting at higher RPMs than at lower RPMs. However, when the vehicle coasts downhill, the road load does not similarly increase, for example because of the effects of gravity. The target deceleration may be determined based on restoring this gap to its expected value.

In certain implementations, the driver may manually modify or adjust the deceleration adjustment. For example, a user interface in the vehicle 100 may allow the driver to increase or decrease the amount of adjustment (e.g., 5%, 10%, etc.). The interface may store user settings as part of a user profile, for instance.

Figure 4:
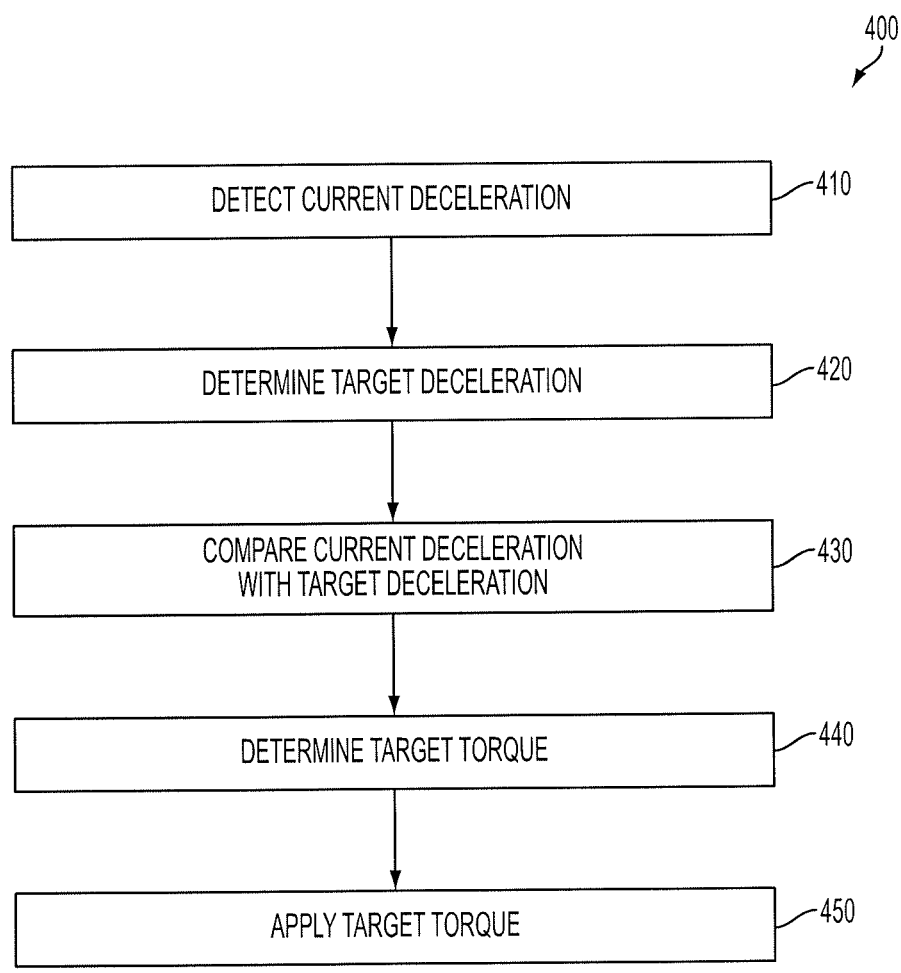
FIG. 4 is a flowchart of deceleration control logic according to an implementation of the present application.

FIG. 4 presents a flowchart 400 of deceleration control logic according to an implementation of the present application. The deceleration control logic may wait until there is a 0% pedal application on the accelerator pedal, such as the accelerator pedal 130. The deceleration control logic may have a delay after the pedal application reaches 0%, for a smoother transition. The deceleration control logic may further wait until the vehicle is decelerating outside of a defined range. For example, the difference between a target deceleration and a current deceleration may be greater than a deceleration threshold. The deceleration control logic may also wait until the vehicle is traveling within a predetermined speed range, such as between 20 mph to 70 mph. The deceleration control logic may cancel out if either the accelerator pedal or the brake pedal is applied.

At 410, the current deceleration is detected. For example, the HV system 210 detects the current deceleration through the accelerometer 184 or other suitable sensors, such as vehicle speed sensors, wheel speed sensors, or propeller shaft sensors. However, if the accelerometer 184 or other suitable sensors fails, the deceleration control logic may gracefully exit by reverting to a normal torque and a normal logic. The HV system 210 may further store the current deceleration for use in the next iteration. When the deceleration control logic is canceled out, the current deceleration may be used as a 0% pedal application value in order to interpolate between the 0% application and 10% application curves.

At 420, the target deceleration is determined. The target deceleration logic 230 determines the target deceleration based on the vehicle's current speed and gear position. The target deceleration may correspond to a coasting deceleration of the vehicle and may be determined by a torque map, such as the map 300. At any given vehicle speed and gear position, the coasting deceleration may be a stored value based on factory testing, or may be based on historical coasting data from the vehicle itself.

At 430, the current deceleration is compared with the target deceleration. At 440, the target torque is determined. The target torque is determined based on adjusting the current deceleration until the target deceleration is achieved.

At 450, the target torque is applied. For example, the processor 150 may control the transmission 120, the engine 110, and/or the first and second motor-generators 191 and 192 to apply the target torque to the propeller shaft. The deceleration control logic may follow or perform several iterations until the target deceleration is achieved.

Those of ordinary skill would appreciate that the various illustrative logical blocks, modules, and algorithm steps described in connection with the examples disclosed herein may be implemented as electronic hardware, computer software, or combinations of both. Furthermore, the present application can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described implementations are to be considered in all respects only as illustrative and not restrictive and the scope of the application is, therefore, indicated by the appended claims rather than by the foregoing description. All changes which come within the meaning and range of equivalency of the claims are to be embraced within their scope.

What is claimed is:

1. A system for controlling deceleration of a vehicle comprising:
   a continuously variable transmission (CVT);
   a sensor configured to detect a plurality of vehicle speeds; and
   a processor coupled to the CVT and the sensor and configured to:
      determine a vehicle deceleration based on the plurality of vehicle speeds,
      determine a target deceleration based on at least one of the plurality of vehicle speeds and a current gear ratio of the CVT, the target deceleration corresponding to a coasting deceleration of the vehicle, and
      adjust a torque output by the CVT so that the vehicle deceleration substantially matches the target deceleration when no braking or acceleration is being requested.

2. The system of claim 1, wherein the processor is further configured to adjust the torque output by adjusting a propeller shaft torque of the CVT.

3. The system of claim 1, wherein the coasting deceleration corresponds to a deceleration of the vehicle when coasting on a level road.

4. The system of claim 1, wherein the processor is further configured to adjust the torque output no braking or acceleration is being requested and a current vehicle speed is within a predetermined range.

5. The system of claim 1, further comprising a memory configured to store a previous target deceleration.

6. The system of claim 1, further comprising a memory configured to store a torque limit map having an expected road load.

7. The system of claim 6, wherein the processor is further configured to adjust the torque output by determining a difference between the expected road load and a torque limit.

8. A system for controlling deceleration of a vehicle comprising:
- a continuously variable transmission (CVT) configured to operate in a plurality of gear ratios;
- a first sensor configured to detect a vehicle deceleration;
- a second sensor configured to detect a vehicle speed; and
- a processor coupled to the CVT, the first sensor and the second sensor and configured to:
  - determine a target deceleration based on the vehicle speed and which of the plurality of gear ratios the CVT is currently operating in, the target deceleration corresponding to a coasting deceleration of the vehicle, and
  - adjust a torque output by the CVT so that the vehicle deceleration substantially matches the target deceleration when no braking or acceleration is being requested and the vehicle speed is within a predetermined range.

9. The system of claim 8, wherein the processor is further configured to adjust the torque output by adjusting a propeller shaft torque of the CVT.

10. The system of claim 8, wherein the coasting deceleration corresponds to a deceleration of the vehicle when coasting on a level road.

11. The system of claim 8, further comprising a memory configured to store a previous target deceleration.

12. The system of claim 8, further comprising a memory configured to store a torque limit map having an expected road load.

13. The system of claim 12, wherein the processor is further configured to adjust the torque output by determining a difference between the expected road load and a torque limit.

14. A method for controlling deceleration of a vehicle comprising:
- detecting a vehicle deceleration;
- detecting a vehicle speed;
- determining a current gear ratio of a continuously variable transmission (CVT);
- determining a target deceleration based on the vehicle speed and the current gear ratio of the CVT, the target deceleration corresponding to a coasting deceleration of the vehicle;
- comparing the vehicle deceleration with the target deceleration;
- determining a target torque that, when applied, will cause the vehicle deceleration to be substantially equal to the target deceleration; and
- applying the target torque.

15. The method of claim 14, wherein the target torque corresponds to a propeller shaft torque.

16. The method of claim 14, wherein applying the target torque further comprises adding the target torque to a current propeller shaft torque.

17. The method of claim 14, wherein the coasting deceleration of the vehicle corresponds to a deceleration of the vehicle when coasting on a level road.

18. The method of claim 14, wherein applying the target torque further comprises applying the target torque when the vehicle speed is within a predetermined speed range.

19. The method of claim 14, wherein applying the target torque further comprises applying the target torque when a difference between the vehicle deceleration and the target deceleration is greater than a deceleration threshold.

20. A system for controlling deceleration of a vehicle comprising:
- at least one of an engine or a motor-generator configured to generate a supply torque;
- a continuously variable transmission (CVT) coupled to the at least one of the engine or the motor-generator;
- a sensor configured to detect a vehicle speed; and
- a processor coupled to the CVT, the sensor and the at least one of the engine or the motor-generator and configured to:
  - determine a target deceleration based on the vehicle speed, the target deceleration corresponding to a coasting deceleration of the vehicle, and
  - adjust a torque output by the CVT by instructing the at least one of the engine or the motor-generator to adjust the supply torque so that the vehicle deceleration substantially matches the target deceleration when no braking or acceleration is being requested.

21. The system of claim 20, wherein the processor is further configured to adjust the torque output by adjusting a propeller shaft torque of the CVT.

22. The system of claim 20, wherein the coasting deceleration corresponds to a deceleration of the vehicle when coasting on a level road.

23. The system of claim 20, further comprising a memory configured to store a previous target deceleration.

24. The system of claim 20, further comprising a memory configured to store a torque limit map having an expected road load.

25. The system of claim 24, wherein the processor is further configured to adjust the torque output by determining a difference between the expected road load and a torque limit.

* * * * *